United States Patent [19]

Berry

[11] Patent Number: 5,218,730

[45] Date of Patent: Jun. 15, 1993

[54] LUG NUT WRENCH

[76] Inventor: David A. Berry, 2009 Sanford St., Philadelphia, Pa. 19116

[21] Appl. No.: 813,482

[22] Filed: Dec. 26, 1991

[51] Int. Cl.⁵ .................................................. B25F 1/04
[52] U.S. Cl. ......................................... 7/100; 81/177.2; 81/177.5; 7/138; 29/245
[58] Field of Search ................... 7/100, 138; 81/177.2, 81/177.5, 177.1, 177.85, 489; 29/245

[56] References Cited

U.S. PATENT DOCUMENTS

| 510,981 | 12/1893 | Massey | 81/177.2 |
| 1,741,810 | 12/1929 | Bidal | 81/177.2 |
| 2,549,910 | 4/1951 | Lane | 81/177.5 |
| 4,376,397 | 3/1983 | Newby et al. | 81/177.2 |

Primary Examiner—Roscoe V. Parker
Attorney, Agent, or Firm—Z. T. Wobensmith, III

[57] ABSTRACT

A lug nut wrench for removing and replacing wheel covers, and to remove and replace lug nuts carried on vehicle axles to mount and dismount wheels or rims. The tool includes a collapsible inner and outer tubes with a sleeve carried on said outer tube, capable of being positioned at multiple locations along the tube, with a shank which detachably carries a socket which engages the lug nuts. A detend is carried by said inner tube which engages holes in said outer tube to lock said tubes at selected locations. A rod having a tapered end portion to fit between the rim and wheel cover is provided, extending from the lever at the end opposite to the sleeve, and which is also used to provide a hand hold to assist in rotating the lever to rotate or turn the lug nuts.

6 Claims, 1 Drawing Sheet

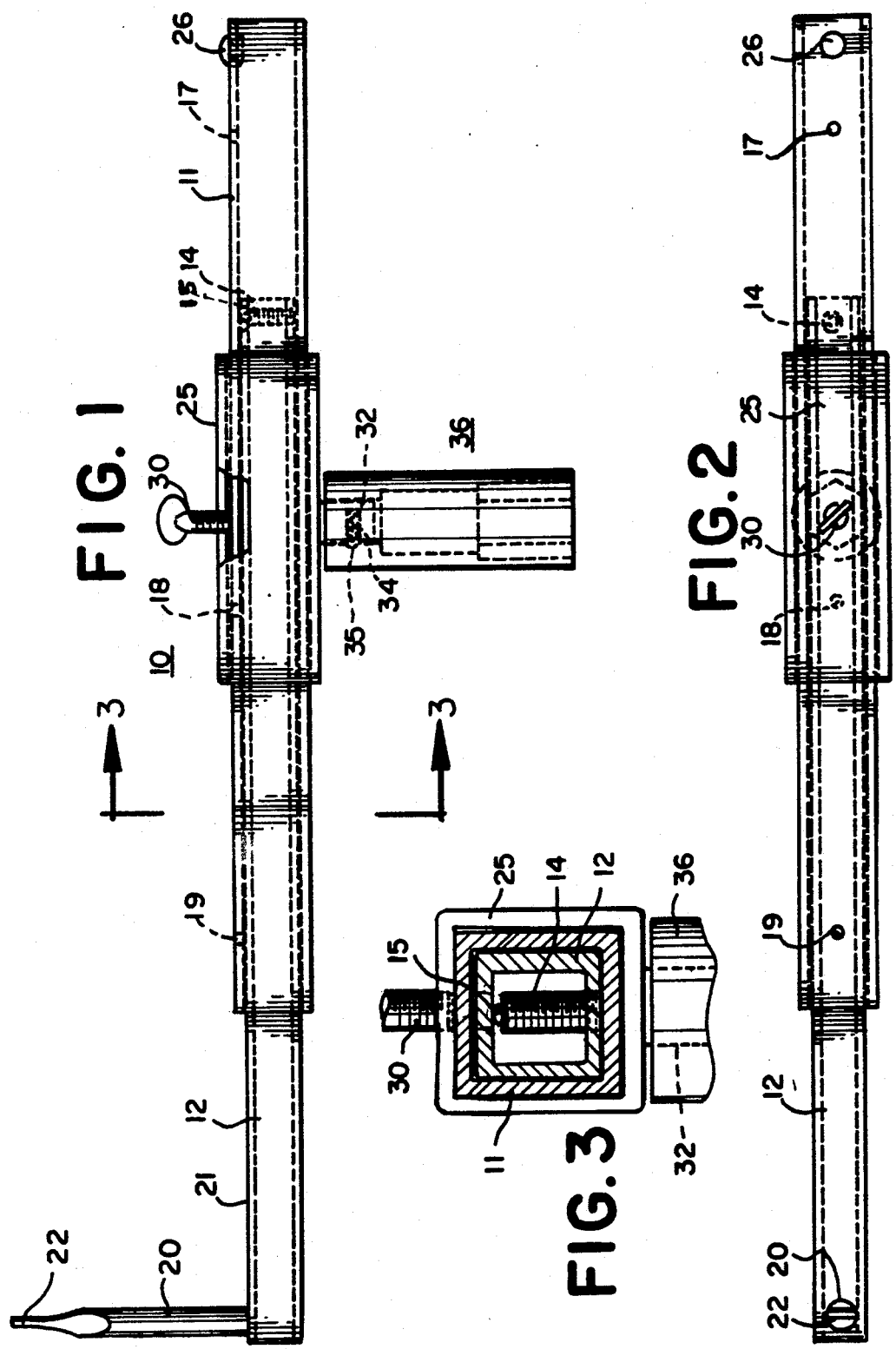

LUG NUT WRENCH

BACKGROUND OF THE INVENTION

1. Field of the Invention

This invention relates to a lug nut wrench to remove and replace lug nuts which is of the universal collapsible type.

2. Description of the Prior Art

With the proliferation of automobiles and other such type vehicles which have lug nuts of varying size, and where the wheel depth, and wheel type also vary, there has been increasing interest in the development of a universal lug nut wrench. Such wrenches must be capable of removing the wheel cover, or center cap to obtain access to the lug nuts, so that the wheel or rim can be mounted and dismounted from the vehicle axle. The wrench must be compact so that it can be stored in the available space provided by the vehicle manufacturer, but must be capable of operation by anyone who has to remove and/or replace lug nuts. Lug nuts are varied as to size, length, tightening requirements, and accessibility due to the considerable variation in vehicle wheel type and width.

Various tools and wrenches have been proposed such as those shown in the U.S. Pat. No. to Davis, Jr. U.S. Pat. No. 3,799,001; Boe U.S. Pat. No. 3,973,283; Florko, Jr. U.S. Pat. No. 4,070,931; Sweitzer U.S. Pat. No. 4,291,425; Houser et al U.S. Pat. No. 4,300,412; Koren et al U.S. Pat. No. 4,625,600; Reynolds U.S. Pat. No. 4,829,856; Brown U.S. Pat. No. 4,972,742; Vazquez U.S. Pat. No. 5,018,413; the British Patent to Bidal No. 292,450; the French Patent to Martin No. 2,544,378 and the German Patent to Swoboda No. 2,603,099. None of the prior art devices provides a lug nut wrench which is useful with a wide variety of cars by virtually anyone who desires to remove and replace lug nuts, and which wrench has the other described desirable properties.

SUMMARY OF THE INVENTION

This invention comprises a new and improved lug nut wrench of the collapsible type, with tow longitudinally extending telescoping square tubes, with a socket detachably carried on a shank on a sleeve which sleeve slides along the outer tube. The sleeve is capable of being fixed at multiple locations. The tubes have spring loaded detents which retain the tubes at the desired extension. A stud extends from the innermost tube, with a tapered end for wheel cover or center cap removal, and to provide additional leverage for lug nut rotation by the user.

The principal object of the invention is to provide a universal lug wrench that can be used by virtually anyone to remove and replace lug nuts.

A further object of the invention is to provide a wrench of the character aforesaid which is simple and inexpensive to construct but sturdy and reliable in use.

A further object of the invention is to provide a wrench of the character aforesaid which can be collapsed to a compact size for storage, and which can be extended for use.

A further object of the invention is to provide a wrench of the character aforesaid which uses replaceable sockets to enable it to remove lug nuts of different size and from wheels of varied depth.

A further object of the invention is to provide a wrench of the character aforesaid which can be adjusted to different lengths to provide the desired leverage to rotate lug nuts and which can also be used to remove center caps and/or wheel covers.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a side elevational view, in partial section, and phantom, of the lug nut wrench of the invention;

FIG. 2 is a top elevational view, in partial phantom, of the lug nut wrench of FIG. 1, and FIG. 3 is a vertical sectional view, enlarged, taken approximately on the line 3—3 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 3 thereof, the lug nut wrench 10 is therein illustrated. The wrench 10 includes a main or outer tube 11 which is of square hollow configuration in cross section, and which has a telescoping inner tube 12 extending therein, also of hollow square configurations. The tubes 11 and 12 are preferably constructed of steel and have a wall thickness of $\frac{1}{8}$ inch in the preferred construction. The inner tube 12 is provided with a spring loaded detent plug 14, which is threadably engaged in an opening 15, in the top wall 21 of tube 12 and selectively engages holes 17, 18, and 19 in tube 11 to restrict tube 12 from coming out of tube 11.

The tube 12 outside of tube 11 is provided with a rod 20 extending perpendicularly upwardly therefrom, on the top wall 21 of tube 12. The rod 20 has a tapered point 22 which can be inserted between the wheel cover or center cap (not shown) for removal from the wheel or rim (not shown) which is to be dismounted.

A sleeve 25, is provided also of square configuration, which is carried on the outer tube 11, and slidable therealong to the left in FIG. 1 until it is restrained on tube 11 by rivet pin 26. The sleeve 25 can move to the right until it contacts pin 26, which extends through tube 11 and restrains sleeve 25 from further movement on tube 11.

A screw 30 of well known type is threadably carried in sleeve 25 and can be tightened to retain sleeve 25 along tube 11 as desired.

The sleeve 25 is also provided with a square shank 32 which extends perpendicularly downwardly from bottom wall 33 of sleeve 25 as shown in FIG. 1.

The shank 32 has a spring urged detent 34 therein of well known type, which engages a recess 35 in a socket 36 which can be attached and detached from shank 32. The socket 36 is of the conventional "deep" type and is selected to fit the size of the lug nut (not shown) to be engaged, and is of appropriate length to engage the lug nut (not shown).

If the rim or wheel width (not shown) requires, an extension (not shown) of well known type can be interposed between the shank 32 and socket 36.

The mode of operation will now be pointed out.

A socket 36 of the required type is selected and engaged with shank 32. The screw 30 is loosened and, sleeve 25 is moved to a desired location, and screw 30 tightened to engage top wall of tube 11 thereby locking the sleeve 25 in operational position. Tube 12 is moved inside tube 11 until it reaches a position where the detent plug 14 engages a hole 17, 18 or 19 which locks the wrench in position. The rod point 22 can be inserted between the wheel cover or center cap (not shown) to be removed and the rim (not shown) and the cap or cover pried off to expose the lug nuts (not shown) to be removed.

The socket 36 is engaged with a lug nut (not shown) and the wrench 10 is rotated thereby unscrewing the lug nut (not shown). The operation is repeated for the remaining lug nuts (not shown). The wheel or rim (not shown) is removed and then replaced with the wrench 10 tightening the lug nuts (not shown).

It should be noted that the position of the inner tube 12 and the sleeve 25 on the outer tube 11 can be varied to provide the necessary leverage and also to collapse the tubes for storage of the wrench 10 as required.

It will thus be apparent that a wrench has been provided with which the objects of the invention are achieved.

I claim:

1. A lug nut wrench for removal and replacement of lug nuts from the axles of vehicles which comprises an elongated outer tube, an elongated inner tube which is in telescoping relation with said outer tube, retaining means carried by said inner tube which engages holes at selected locations on said outer tube to lock said tubes at desired position, a sleeve carried on the outer tube and longitudinally movable therealong, retaining means engaged with said outer tube to retain said sleeve at selected locations along said tube, and a socket detachable engaging a portion of said sleeve which engages said lug nuts for removal and replacement.

2. A lug nut wrench as defined in claim 1 in which said sleeve has a shank extending therefrom, a spring loaded detent in said shank, said socket is engaged with said shank and said detent.

3. A lug nut wrench as defined in claim 1 in which said inner and outer tube are of square configuration in cross section, and said sleeve is of square configuration in cross section.

4. A lug nut wrench as defined in claim 1 in which said outer tube is provided with restraining means to prevent said sleeve from coming off of said outer tube.

5. A lug nut wrench as defined in claim 1 in which said inner tube is provided with means to remove a vehicle wheel cover or center cap.

6. A lug nut wrench as defined in claim 1 in which said inner and outer tubes and said sleeve are of metal.

* * * * *